United States Patent
Kuriyama et al.

(10) Patent No.: US 7,455,318 B2
(45) Date of Patent: Nov. 25, 2008

(54) OCCUPANT RESTRAINT SYSTEM

(75) Inventors: Kazuyuki Kuriyama, Okazaki (JP); Mutsuo Muramatsu, Tokai (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 568 days.

(21) Appl. No.: 11/216,094

(22) Filed: Sep. 1, 2005

(65) Prior Publication Data

US 2006/0043713 A1 Mar. 2, 2006

(30) Foreign Application Priority Data

Sep. 2, 2004 (JP) ............................. 2004-255873

(51) Int. Cl.
*B60R 21/16* (2006.01)
(52) U.S. Cl. ..................... 280/735; 280/730.1; 280/753
(58) Field of Classification Search ................. 280/735, 280/730.1, 729, 753
See application file for complete search history.

(56) References Cited

U.S. PATENT DOCUMENTS 6,712,384 B2 * 3/2004 Abe ......................... 280/730.1
6,976,706 B2 * 12/2005 Smith et al. ................. 280/753

FOREIGN PATENT DOCUMENTS

JP 1-156155 A 6/1989

\* cited by examiner

*Primary Examiner*—Eric Culbreth
(74) *Attorney, Agent, or Firm*—Birch, Stewart, Kolasch & Birch, LLP

(57) ABSTRACT

An occupant restraint system having a knee airbag and an upper-body airbag. The control unit inflates only the knee airbag if the impact load applied to the vehicle due to a collision or the like is equal to or greater than the first predetermined value and less than the second predetermined value that is set larger than the first predetermined value, and inflates both the knee airbag and the upper-body airbag if the impact load is equal to or greater than the second predetermined value.

11 Claims, 3 Drawing Sheets

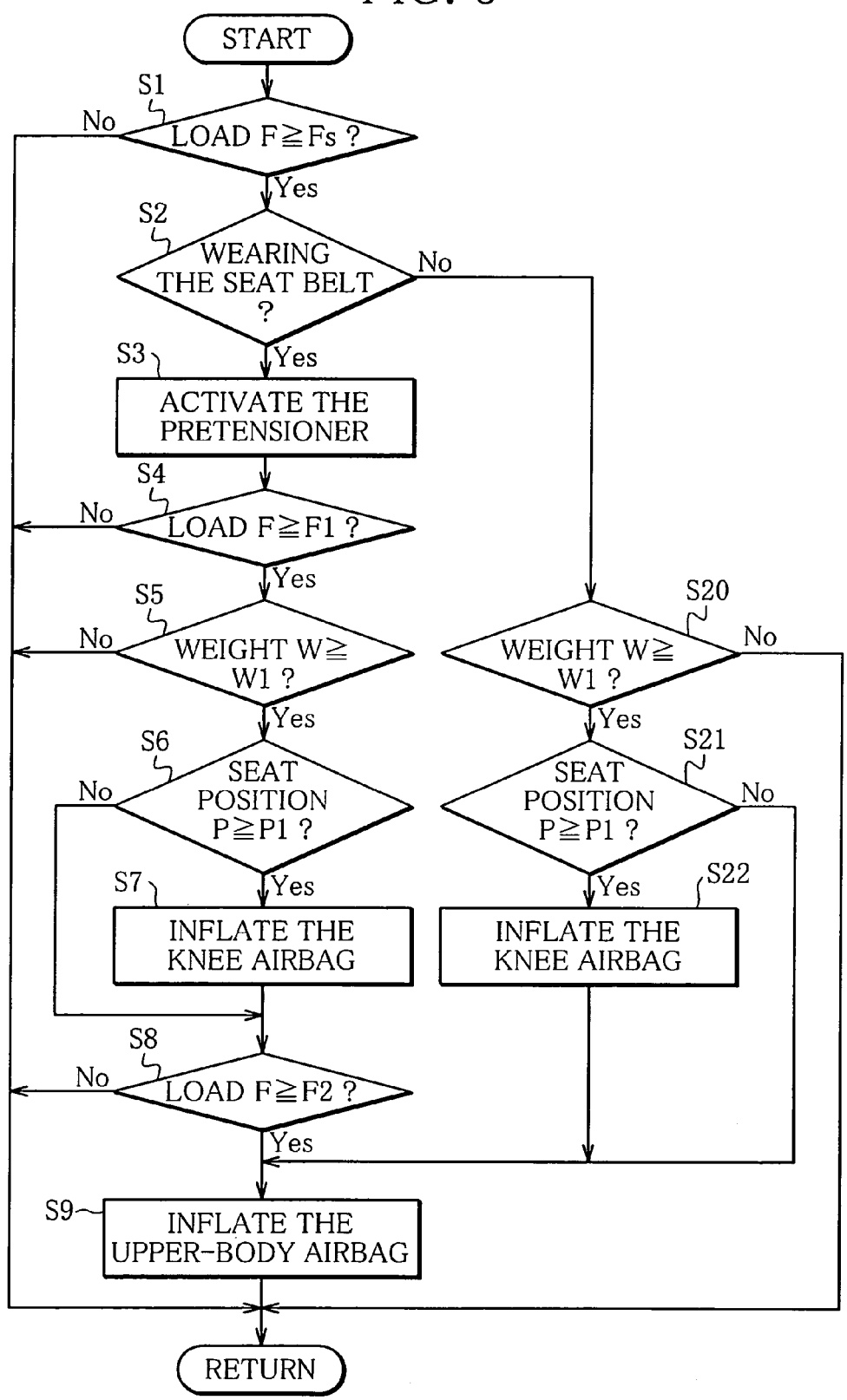

OCCUPANT RESTRAINT SYSTEM

BACKGROUND OF THE INVENTION

1. Field of the Invention

The present invention relates to an occupant restraint system for protecting occupants sitting in vehicle front seats.

2. Description of the Related Art

Occupant restraint systems, such as seat belts and airbags, for protecting a vehicle occupant in case that the vehicle impact applies a given or greater impact load due to a collision with another vehicle, obstacle or the like, have been well known.

One of such occupant restraint systems is a knee airbag that is inflated near the occupant's knees to protect the knees. The knee airbag is installed independently of an upper-body airbag for protecting the occupant's upper body.

The knee airbag is inflated the given time earlier than the upper-body airbag, to thereby prevent the occupant's knees from hitting against the instrument panel or the occupant's body from sliding under the instrument panel. Moreover, the knee airbag restrains the occupant's knees to lock his/her lower body, so that the occupant's upper body that is bent at his/her lumber part is received by the upper-body airbag at the best angle for occupant protection. An occupant restraint system provided with such a knee airbag is disclosed in Unexamined Japanese Patent Publication No. H01-156155 (hereinafter referred to as Patent Document 1).

In the occupant restraint system disclosed in the Patent Document 1, a knee airbag and an upper-body airbag are both inflated every time the vehicle is applied with the given or greater impact load. Therefore, even if a collision occurs when the vehicle runs at relatively low speed, and a seat belt is then sufficient for the protection of the upper body, both the knee and upper-body airbags are inflated.

In the event of low-speed collisions, however, the vehicle often remains capable of running after the collision. In such cases, if the upper-body airbag is inflated at the same time as mentioned above, this causes the problem that the upper-body airbag obstructs the occupant's vision, making the driving after the collision difficult.

SUMMARY OF THE INVENTION

The present invention has been made in order to solve such a problem, and an object thereof consists in providing an occupant restraint system that is capable of affording proper occupant protection according to a degree of impact load applied to a vehicle.

To achieve the above object, an aspect of the present invention is an occupant restraint system, comprising: a knee airbag configured to protect knees of an occupant sitting in a vehicle front seat when inflated; an upper-body airbag configured to protect an upper body of the occupant when inflated; and control means for inflating only the knee airbag between the knee airbag and the upper-body airbag when the vehicle is applied with impact load that is equal to or greater than a first predetermined value and less than a second predetermined value that is set greater than the first predetermined value, and for inflating both the knee airbag and the upper-body airbag when the vehicle is applied with impact load that is equal to or greater than the second predetermined value.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 3 is a flowchart showing a control routine that is implemented by the ECU installed in the occupant restraint system according to the present invention.

DETAILED DESCRIPTION OF THE PREFERRED EMBODIMENTS

An embodiment of the present invention will be described below with reference to the attached drawings.

Figure 1:
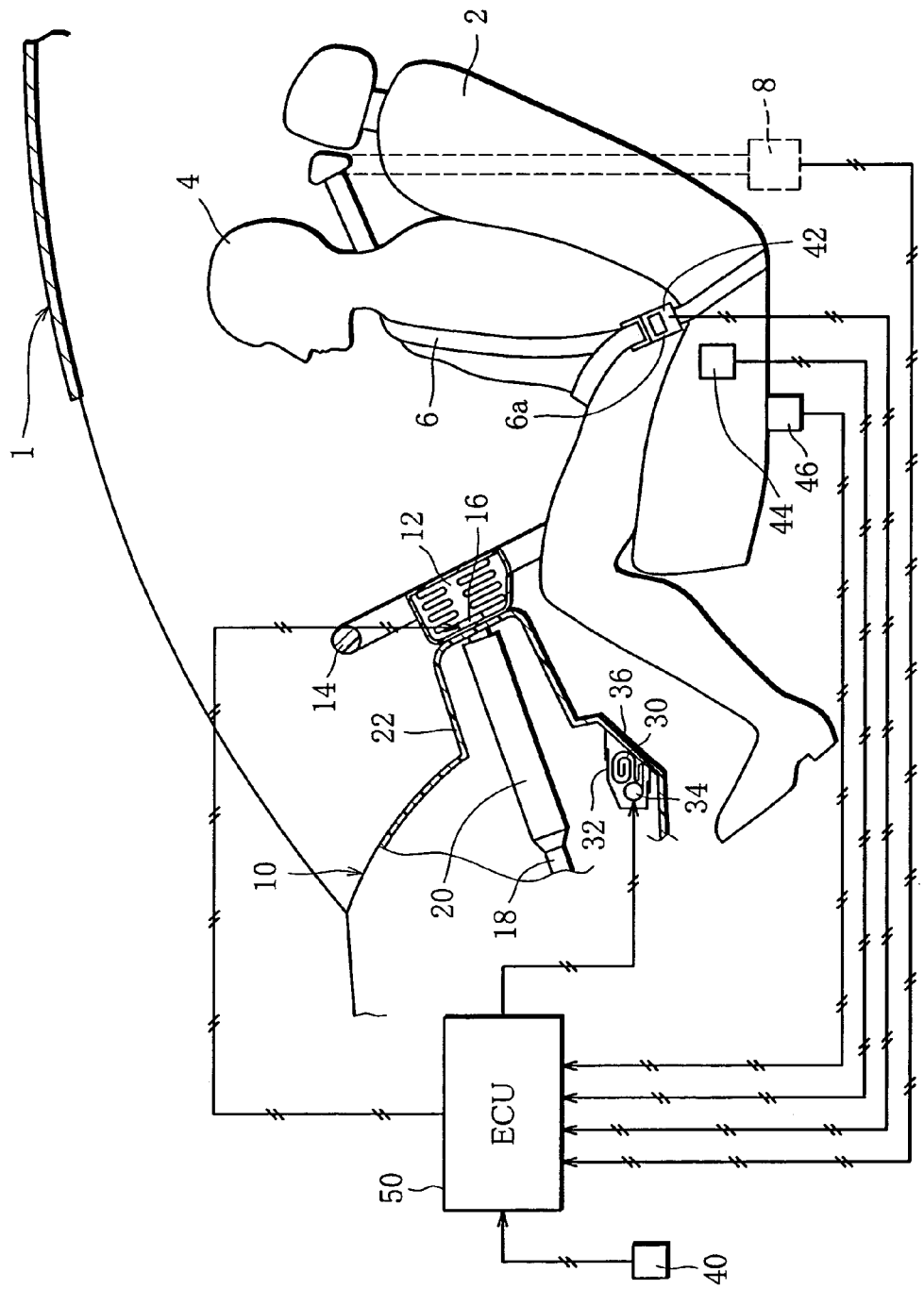
FIG. 1 is a schematic view of a construction of a driver's seat and its surrounding area in which an occupant restraint system according to the present invention is installed.

FIG. 1 is a schematic view of a construction of a driver's seat and its surrounding area in which an occupant restraint system according to the present invention is installed. Descriptions will be provided below with reference to FIG. 1.

As illustrated in FIG. 1, an adjustable seat (front seat) 2 that slides back and forth is placed in a driver's seat of a vehicle 1. The seat 2 is provided with a seat belt 6 that is coupled to a buckle 6a to restraint a sitting occupant 4. Disposed in one end of the seat belt 6 is a pretensioner 8, which is so designed as to pull in the seat belt 6 when activated.

In a front part of a compartment, there is disposed an instrument panel 10 extending in a width direction of the vehicle 1. A steering wheel 14 is secured in a portion of the instrument panel 10, which is located in front of the seat 2. Accommodated in the inside of a central portion of the steering wheel 14 are an upper-body airbag 12 in its folded position and an inflator 16 that supplies the upper-body airbag 12 with inflation gas.

The steering wheel 14 is connected to one end of a steering shaft 18. The steering shaft 18 runs through the center of a steering column 20 and is jointed to a steering gear box (not shown) by using a steering joint (not shown). An upper portion of the steering column 20 is covered with a column cover 22.

A knee airbag 30 is positioned in a lower portion of the instrument panel 10. To be concrete, a case 32 that is open toward the seat 2 side is fixed in the inside of a portion of the instrument panel 10, which is located under the column cover 22. The knee airbag 30 in its folded position and an inflator 34 that supplies the knee airbag 30 with inflation gas are accommodated in the case 32. An opening portion of the case 32 is covered with a knee airbag cover 36.

In a front section of the vehicle 1, there is disposed a load sensor 40 for detecting impact load F that is applied to the vehicle at the moment of a collision. The seat 2 is provided with a buckle switch 42 for detecting whether the occupant 4 sitting in the seat 2 is wearing the seat belt 6, a weight sensor (weight-detecting means) 44 for detecting weight W of the occupant 4, and a seat position sensor (seat position-detecting means) 46 for detecting a longitudinal position P of the seat 2. These sensors of various kinds are electrically connected to an ECU (electronic control unit) 50 that is mounted in the vehicle 1.

Figure 2:
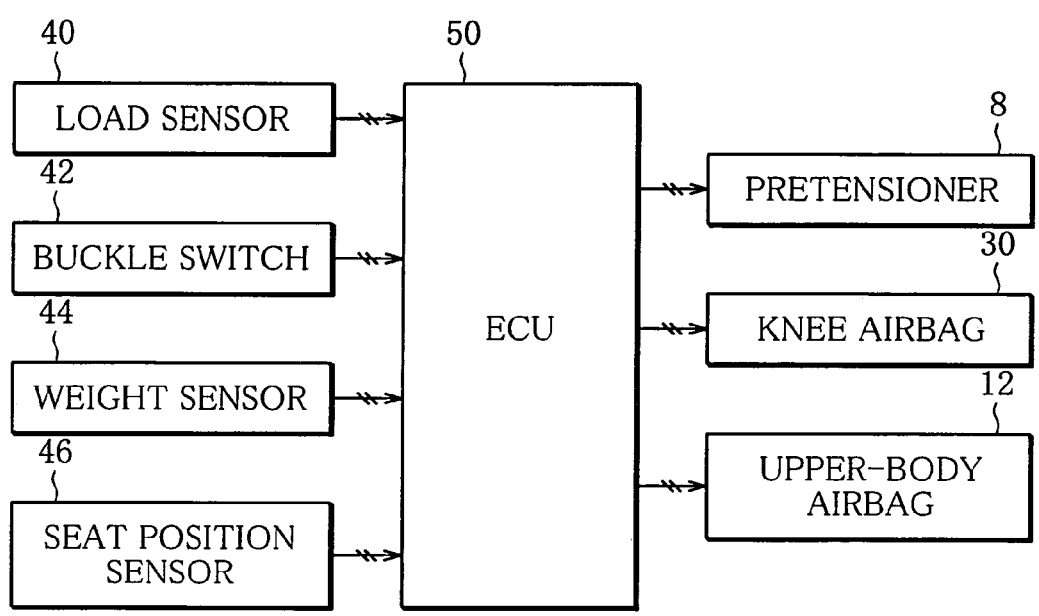
FIG. 2 is a block diagram showing an input/output relation of an ECU that implements various kinds of controlling operations of the occupant restraint system according to the present invention.

FIG. 2 is a block diagram showing an input/output relation of the ECU 50. As illustrated in FIG. 2, various pieces of information are inputted into the ECU 50, including the impact load F detected by the load sensor 40, the use/non-use of the seat belt 6 which is detected by the buckle switch 42, the weight W detected by the weight sensor 44, and the seat position P detected by the seat position sensor 46. The ECU 50 outputs calculation results based on the various pieces of information to the pretensioner 8, the upper-body airbag 12 and the knee airbag 30, thereby implementing the control of the pretensioner 8, the upper-body airbag 12 and the knee airbag 30 (control means).

Although the driver's seat is taken as an example here, the descriptions of the driver's seat can apply to a passenger seat. In other words, the passenger seat is also provided with a seat (front seat) 2 formed integrally with or separately from the driver's seat. An upper-body airbag 12 and an inflator 16 are accommodated in an upper portion of a portion of the instrument panel 10, which is located in front of the passenger seat. A case 32 is fixed in the lower portion of the instrument panel 10, which is located in front of the passenger seat. Accommodated in the case 32 are a knee airbag 30 in its folded position and an inflator 34. As with the driver's seat, the passenger seat is provided with a buckle switch 42, a weight sensor 44 and a seat position sensor 46 in the seat 2.

Operation of the occupant restraint system according to the present invention thus constructed will be described below.

FIG. 3 is a flowchart showing a control routine that is implemented by the ECU 50 when the vehicle is applied with impact load due to a collision or the like. Descriptions will be provided with reference to this flowchart.

In general, the flowchart in FIG. 3 compares the impact load F with respect to F1 (the first predetermined value) relating to possible inflation of a knee airbag, F2 (the second predetermined value) relating to the possible inflation of an upper-body air bag and Fs (the third predetermined value) relating to the possible activation of a seat belt pretensioner.

Firstly in Step S1, the impact load F applied to the vehicle 1 and detected by the load sensor 40 is recognized. Subsequently, a determination is made as to whether the impact load F is equal to or greater than judging load Fs (third predetermined value) that is preset to determine the need for activation of the pretensioner 8. The judging load Fs is set equivalent to impact load that is produced when the vehicle 1 collides with an obstacle or the like at extremely low speed (5 km/h, for example). If the determination result is "NO", the routine is exited. Contrary, if the result is "YES", the routine proceeds to Step S2.

Step S2 makes a determination as to whether the occupant 4 is wearing the seat belt 6 on the basis of a signal from the buckle switch 42. If the determination result is "NO", the routine branches to Step S20. Contrary, if the result is "YES", the routine proceeds to Step S3.

Step S3 activates the pretensioner 8 and pulls in the seat belt 6, to thereby restrain the occupant's body to the seat 2.

In the subsequent Step S4, a determination is made as to whether the impact load F that has been recognized in Step S1 is equal to or greater than first predetermined load F1 (first predetermined value) that is preset. The first predetermined load F1 is set greater than the judging load Fs (F1>Fs) and equivalent to impact load that is produced when the vehicle 1 collides with an obstacle or the like at relatively low speed (10 km/h, for example). If the determination result is "NO", the routine is exited. Contrary, if the result is "YES", the routine proceeds to Step S5.

In Step S5, the weight W that is put on the seat 2, detected by the weight sensor 44, is recognized. Then, a determination is made as to whether the weight W is equal to or more than predetermined weight W1 that is preset. As to the passenger seat, the predetermined weight W1 is set (20 kgf, for example) equal to or more than weight of a child seat in which an infant is seated. If the determination result of Step S5 is "NO", the routine is exited. If "YES", the routine proceeds to Step S6.

In Step S6, the seat position P detected by the seat position sensor 46 is recognized, and a determination is made as to whether the seat position P is equal to or more than a predetermined position P1 that is preset. The seat position P here is a value that becomes greater as the seat 2 moves rearward on the presumption that a front end of an longitudinal slidable range of the seat 2 is zero. The predetermined position P1 is set as a seat position located on a relatively front side (for example, a position located in the front one-third of the longitudinal slidable range). If the determination result of Step S6 is "NO", the routine branches to Step S8. If "YES", the routine proceeds to Step S7.

Step S7 sends a signal to the inflator 34 and inflates the knee airbag 30 to restrain the knees of the occupant 4. The routine then proceeds to Step S8.

Step S8 makes a determination as to whether the impact load F recognized in Step S1 is equal to or greater than second predetermined load F2 (second predetermined value) that is preset. The second predetermined load F2 is set greater than the first predetermined load F1 and as great as the occupant 4 cannot not be fully protected only by activation of the pretensioner 8 and the knee airbag 30 in the event of a collision of the vehicle 1 (for example, set equivalent to impact load produced in the event of a collision with an obstacle at a speed of 20 km/h) (F2>F1>Fs). If the determination result of Step S8 is "NO", the routine is exited. If the result is "YES", the routine proceeds to Step S9.

Step S9 sends a signal to the inflator 16 and inflates the upper-body airbag 12, and the routine is exited. However, if the knee airbag 30 is inflated in Step S7, the upper-body airbag 12 is inflated after the inflation of the knee airbag 30 with a predetermined time delay.

If the determination result of Step S2 is "NO", that is, if the occupant 4 is not wearing the seat belt 6, the routine branches to Step S20. In Step S20, as in Step S5, the weight W is recognized, and a determination is made as to whether the weight W is equal to or more than the predetermined weight W1. If the determination result is "NO", the routine is exited. Contrary, if the result is "YES", the routine proceeds to Step S21.

In Step S21, as in Step S6, the seat position P is recognized, and a determination is made as to whether the seat position P is equal to or more than the predetermined position P1. if the determination result is "NO", the routine advances to Step S9. A signal is sent to the inflator 16 to inflate the upper-body airbag 12, and the routine is exited. if the determination result is "YES", the routine proceeds to Step S22. A signal is sent to the inflator 34 to inflate the knee airbag 30 for the situation where the occupant is not wearing a seatbelt as was determined in step 82. The routine further proceeds to Step S9 and sends a signal to the inflator 16 to inflate the upper-body airbag 12, and the routine is exited. Again, the upper-body airbag 12 is inflated after the inflation of the knee airbag 30 with a predetermined time delay.

As described above, the occupant restraint system according to the present invention does not activate anything in case that the impact load F applied to the vehicle 1 is less than the judging load Fs when the occupant 4 is wearing the seat belt 6. The system activates only the pretensioner 8 in case that the impact load F is equal to or greater than the judging load Fs and less than the first predetermined load F1. The system activates the pretensioner 8 and inflates the knee airbag 30 in case that the impact load F is equal to or greater than the first predetermined load F1 and less than the second predetermined load F2. In other words, when the impact load applied to the vehicle 1 is less than the second predetermined load F2 that is as relatively small as the vehicle 1 remains capable of running after the collision, the upper-body airbag 12 is not inflated. This prevents needless inflation, and the occupant 4 can drive safely after the collision since the upper-body airbag 12 does not obstruct the occupant's view.

In case that the impact load F is equal to or greater than the second predetermined load F2, the system activates the pretensioner 8, and inflates the knee airbag 30 and the upper-body airbag 12. In this case, the knee airbag 30 is inflated prior to the upper-body airbag 12. This makes it possible to restrain the upper body of the occupant 4 at an appropriate angle by using the upper-body airbag 12 when the vehicle 1 is applied with relatively great impact load. Consequently, the occupant 4 can be securely protected.

When the occupant 4 is not wearing the seat belt 6, both the knee airbag 30 and the upper-body airbag 12 are inflated if the impact load F applied to the vehicle 1 is equal to or greater than the judging load Fs. As a result, even if the occupant 4 is not wearing the seat belt 6, it is possible to securely protect the occupant 4.

Whether the occupant 4 is wearing the seat belt 6 or not, if the weight W put on the seat 2 is less than the predetermined weight W1, the knee airbag 30 and the upper-body airbag 12 are not inflated, which prevents the needless inflation of the airbags. Moreover, in case that the seat position P is adjusted forward in accordance with a diminutive constitution of the occupant 4, the knee airbag is not inflated. This prevents an impact upon the knees of the occupant 4 attributable to the inflation of the knee airbag 30, to thereby properly protect the occupant 4.

As mentioned above, the occupant restraint system according to the present invention is capable of preventing the needless inflation of the airbags and achieving the proper occupant protection according to the degree of the impact load F applied to the vehicle 1.

Although the description of the embodiment of the occupant restraint system according to the present invention is completed here, the embodiment is not limited to the aforementioned one.

For instance, in the above embodiment, determinations are made as to the use/non-use of the seat belt 6, the weight W put on the seat 2, and the seat position P. These determinations, however, are not necessarily required. In other words, it is possible to skip all or part of these determinations, and control the inflation of the knee airbag 30 and the upper-body airbag 12 according to the degree of the impact load F.

To be specific, although the control is varied according to the use/non-use of the seat belt 6 for example, the routine may skip the step of determining the use/non-use of the seat belt 6 and advances directly to Step S3 in the flowchart shown in FIG. 3 if the determination result of Step S1 is "YES".

It is also possible, for example, to eliminate the switching of control content based on the weight W and to make the routine advance directly to Step S6 in the flowchart shown in FIG. 3 if the determination result of Step S4 is "YES". Likewise, if the determination result of Step S2 is "NO", the routine may advance directly to Step S21.

Furthermore, it is also possible that the routine skips the switching of the control based on the seat position P and advances directly to Step S7 in the flowchart of FIG. 3 if the determination result of Step S5 is "YES". In addition, the routine may advance directly to Step S22 if the determination result of Step S20 is "YES".

It is also possible to properly set specific values of the judging load Fs, the predetermined loads F1 and F2, the predetermined weight W1, and the predetermined position P1 in the above embodiment.

In the above embodiment, the impact load F applied to the vehicle 1 is detected by the load sensor 40. It is possible, however, to utilize any sensor as long as it is capable of detecting the impact load F applied to the vehicle 1. The impact load applied to the vehicle 1 may be detected by another element by utilizing another sensor, such as a G sensor.

Although in the above embodiment, the upper-body airbag for the driver's seat is accommodated in the central portion of the steering wheel 14, the storage place of the upper-body airbag 12 for the driver's seat is not limited to this. On the contrary, the upper-body airbag 12 may be accommodated in any position as long as it can protect the driver when inflated.

Likewise, the storage place of the upper-body airbag for the passenger seat is not necessarily limited to the upper portion of the instrument panel 10. The upper-body airbag 12 may be accommodated in any position as long as it can protect the occupant sitting in the passenger seat when inflated.

As to the knee airbags 30 for the driver's seat and for the passenger seat, the storage places thereof are not limited to the lower portion of the instrument panel 10. The knee airbags 30 may be accommodated in any places as long as they can protect the occupants' knees when inflated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An occupant restraint system comprising:
   a knee airbag configured to protect knees of an occupant sitting in a vehicle front seat when inflated;
   an upper-body airbag configured to protect an upper body of said occupant when inflated; and
   control means for inflating only said knee airbag between said knee airbag and said upper-body airbag when said vehicle receives impact load that is equal to or greater than a first predetermined value and less than a second predetermined value that is set greater than said first predetermined value, and for inflating both said knee airbag and said upper-body airbag when said vehicle receives impact load that is equal to or greater than said second predetermined value.

2. The occupant restraint system according to claim 1, wherein said control means inflates said upper-body airbag after the lapse of a predetermined time from the inflation of said knee airbag when inflating both said knee airbag and said upper-body airbag.

3. The occupant restraint system according to claim 1, wherein said front seat is provided with a seat belt tat has a pretensioner and restrains the occupant, and said control means further pulls in said seat belt by activation of said pretensioner when said vehicle receives impact load that is equal to or greater tan a third predetermined value tat is set smaller than said first predetermined value.

4. The occupant restraint system according to claim 3, wherein said control means inflates both said knee airbag and said upper-body airbag at the moment said vehicle receives impact load that is equal to or greater than said third predetermined value if the occupant sitting in said front seat is not wearing said seat belt.

5. The occupant restraint system according to claim 4, wherein said control means inflates said upper-body airbag after the lapse of a predetermined time from the inflation of said knee airbag when inflating both said knee airbag and said upper-body airbag.

6. The occupant restraint system according to claim 4, wherein said front seat is adjustable in a longitudinal position thereof, and further has seat position-detecting means for detecting the longitudinal position of said front seat, and said control means does not inflate said knee airbag even if impact load that is equal to or greater than said third predetermined value is applied, but inflates said upper-body airbag, if the occupant sitting in said front seat is not wearing the seat belt, and if the longitudinal position of said front seat detected by said seat position-detecting means is located forward of a predetermined position.

7. The occupant restraint system according to claim 6, further comprising weight-detecting means for detecting weight of an object placed on said seat; wherein said control means does not inflate said knee airbag and said upper-body airbag regardless of a degree of the impact load applied to said vehicle if the weight detected by said weight-detecting means is smaller than predetermined weight.

8. The occupant restraint system according to claim 1, wherein said front seat is adjustable in a longitudinal position thereof and has seat position-detecting means for detecting the longitudinal position of said front seat, and said control means does not inflate said knee airbag even if impact load that is equal to or greater than said first predetermined value is applied if the longitudinal position of said front seat detected by said seat position-detecting means is located forward of a predetermined position.

9. The occupant restraint system according to claim 1, further comprising weight-detecting means for detecting weight of an object placed on said seat; wherein said control means does not inflate said knee airbag and said upper-body airbag regardless of a degree of impact load applied to said vehicle if the weight detected by said weight-detecting means is smaller than predetermined weight.

10. A method for activating an occupant restraint system including a knee airbag configured to protect knees of an occupant sitting in a vehicle front seat when inflated and an upper-body airbag configured to protect an upper body of an occupant when inflated, comprising:

inflating only said knee airbag between said knee airbag and said upper-body airbag when said vehicle receives an impact load tat is equal to or greater than a first predetermined value and less than a second predetermined value tat is set greater than said first predetermined value, and inflating both said knee airbag and said upper-body airbag when said vehicle receives impact load tat is equal to or greater tan said second predetermined value.

11. The method for inflating an occupant restraint system according to claim 10, wherein a front seat belt pretensioner is activated to pull in a seat belt when said vehicle receives impact load that is equal to or greater than a third predetermined value that is set smaller than said first predetermined value.

* * * * *